United States Patent
Liu et al.

(10) Patent No.: US 10,658,671 B2
(45) Date of Patent: May 19, 2020

(54) POLYMER PROTECTING LAYER, LITHIUM METAL NEGATIVE ELECTRODE, LITHIUM SECONDARY BATTERY

(71) Applicant: NINGDE AMPEREX TECHNOLOGY LIMITED, Ningde (CN)

(72) Inventors: Chengyong Liu, Ningde (CN); Bingbin Wu, Ningde (CN); Yongsheng Guo, Ningde (CN); Ziqi Yi, Ningde (CN); Li An, Ningde (CN)

(73) Assignee: Ningde Amperex Technology Limited, Ningde, Fujian (CN)

( * ) Notice: Subject to any disclaimer, the term of this patent is extended or adjusted under 35 U.S.C. 154(b) by 0 days.

(21) Appl. No.: 16/113,910

(22) Filed: Aug. 27, 2018

(65) Prior Publication Data

US 2018/0366735 A1 Dec. 20, 2018

Related U.S. Application Data

(63) Continuation of application No. 15/481,176, filed on Apr. 6, 2017.

(30) Foreign Application Priority Data

Apr. 19, 2016 (CN) .......................... 2016 1 0242231

(51) Int. Cl.
| | |
|---|---|
| *H01M 4/62* | (2006.01) |
| *H01M 4/134* | (2010.01) |
| *H01M 4/38* | (2006.01) |
| *C08J 5/22* | (2006.01) |
| *H01M 10/052* | (2010.01) |
| *B01J 43/00* | (2006.01) |

(52) U.S. Cl.
CPC ............. *H01M 4/628* (2013.01); *B01J 43/00* (2013.01); *C08J 5/2231* (2013.01); *H01M 4/134* (2013.01); *H01M 4/382* (2013.01); *H01M 4/622* (2013.01); *C08J 2325/18* (2013.01); *H01M 10/052* (2013.01)

(58) Field of Classification Search
CPC ...... H01M 4/628; H01M 4/622; H01M 4/382; H01M 4/134; H01M 10/052; C08J 5/2231; C08J 2325/18; B01J 43/00
See application file for complete search history.

(56) References Cited

U.S. PATENT DOCUMENTS

| | | | |
|---|---|---|---|
| 2005/0250052 A1 | 11/2005 | Nguyen | |
| 2011/0003211 A1 | 1/2011 | Hudson et al. | |
| 2014/0206251 A1* | 7/2014 | Stokes | .................... C08L 23/10 442/91 |

FOREIGN PATENT DOCUMENTS

| | | |
|---|---|---|
| CN | 1489229 A | 4/2004 |
| CN | 101939869 A | 1/2011 |
| CN | 103262310 A | 8/2013 |
| EP | 1157854 A2 | 11/2001 |
| JP | 2005283643 A | 10/2005 |

OTHER PUBLICATIONS

Liu, Office Action, U.S. Appl. No. 15/481,176, dated Sep. 6, 2018, 8 pgs.
Liu, Final Office Action, U.S. Appl. No. 15/481,176, dated Jan. 22, 2019, 7 pgs.
Liu, Office Action, U.S. Appl. No. 15/481,176, dated Jun. 27, 2019, 10 pgs.
Liu Final Office Action, U.S. Appl. No. 15/481,176, dated Dec. 27, 2019, 9 pgs.

* cited by examiner

*Primary Examiner* — Maria Laios
*Assistant Examiner* — Kwang Han
(74) *Attorney, Agent, or Firm* — Morgan, Lewis & Bockius LLP

(57) ABSTRACT

The present disclosure provides a polymer protecting layer, a lithium metal negative electrode, a lithium secondary battery. In the lithium secondary battery of the present disclosure, a polymer protecting layer comprising a polymer ionic liquid is coated on a surface of a lithium metal sheet.

10 Claims, No Drawings

POLYMER PROTECTING LAYER, LITHIUM METAL NEGATIVE ELECTRODE, LITHIUM SECONDARY BATTERY

CROSS-REFERENCE TO RELATED APPLICATIONS

The present application is a continuation application of U.S. patent application Ser. No. 15/481,176, entitled "POLYMER PROTECTING LAYER, LITHIUM METAL NEGATIVE ELECTRODE, LITHIUM SECONDARY BATTERY", filed Apr. 6, 2017, which claims priority to Chinese Patent Application No. 201610242231.2, entitled "POLYMER PROTECTIVE FILM, METALLIC LITHIUM NEGATIVE PLATE AND LITHIUM SECONDARY BATTERY", filed on Apr. 19, 2016, all of which are hereby incorporated by reference in their entirety.

FIELD OF THE PRESENT DISCLOSURE

The present disclosure relates to a field of lithium secondary battery, and particularly relates to a polymer protecting layer, a lithium metal negative electrode, a lithium secondary battery.

BACKGROUND OF THE PRESENT DISCLOSURE

At present, the lithium-ion battery has been widely used in electronic products such as mobile phones, laptops and cameras. At present, the commercial lithium-ion battery mainly uses graphite as the negative active material, but its specific discharge capacity has been close to a theoretical value of graphite (372 mAh/g), therefore it is difficult to further increase the specific discharge capacity of the lithium-ion battery by processing a modification technology on the graphite. The theoretical value of the lithium metal is as high as 3860 mAh/g, and the electrode potential of the lithium metal is as low as −3.04V (vs. $H_2/H^+$), so the development of the lithium secondary battery using the lithium metal as the negative electrode has aroused the attention of researchers. However, there are two main obstacles in the further development of the lithium secondary battery: (1) the lithium dendrite is easily formed during cycle processes of the lithium secondary battery, the lithium secondary battery is easily short-circuited; (2) the lithium dendrite has a large surface area, a high reactivity and easily reacts with electrolyte, therefore the SEI membrane formed on the surface of the lithium metal is ceaselessly destroyed and formed, the electrolyte and the lithium ions are ceaselessly consumed, thereby decreasing cycle efficiency of the lithium secondary battery and shortening the cycle life of the lithium secondary battery. Therefore, how to effectively improve the surface properties of the lithium metal and inhibit the growth of the lithium dendrite is the key issue in the further development of the lithium secondary battery.

At present, many studies are focused on adding functional additive agents into the electrolyte, such as vinylene carbonate (VC), fluoroethylene carbonate (FEC), 2-methylfuran (2Me-F), alkali metal cations and the like. These functional additive agents can react with the lithium metal via adsorption reactions, decomposition reactions, polymerization reactions and the like to form a new protective membrane on the surface of the SEI membrane so as to enhance the properties of the SEI membrane on the surface of the lithium metal, thereby improving the cycle performance of the lithium secondary battery. However, there is a problem that the in-situ formed protective membrane has a weak mechanical strength and cannot completely cover the SEI membrane on the surface of the lithium metal, therefore it cannot completely prevent the SEI membrane from being severely and ceaselessly destroyed and formed during the lithium deposition/dissolution processes which is caused by change of the lithium metal topography. The growth of the lithium dendrite and the problems caused by the lithium dendrite are not solved substantially. Therefore, it is imperative to explore and develop an effective lithium metal protection technology to inhibit the growth of the lithium dendrite, improve the cycle performance, the coulomb efficiency and the safety performance of the lithium secondary battery.

SUMMARY OF THE PRESENT DISCLOSURE

In view of the problems existing in the background of the present disclosure, an object of the present disclosure is to provide a polymer protecting layer, a lithium metal negative electrode, a lithium secondary battery, the polymer protecting layer comprising a polymer ionic liquid is coated on a surface of a lithium metal sheet, which can effectively slow down or even inhibit the growth of the lithium dendrite, improve the first charge-discharge cycle coulombic efficiency of the lithium secondary battery, and significantly improve the cycle performance and the safety performance of the lithium secondary battery.

In order to achieve the above object, the present disclosure provides a lithium secondary battery comprising a lithium metal negative electrode, in which the lithium metal negative electrode comprising: a lithium metal sheet; and a polymer protecting layer provided at the lithium metal sheet; in which the polymer protecting layer comprising inorganic nanoparticles and a polymer ionic liquid with a formula I;

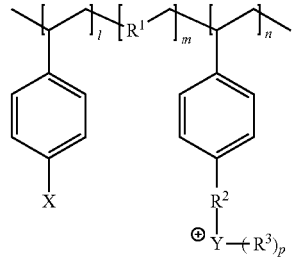

formula I

In formula I,

X being one selected from the group consisting of —COO⁻, —SO₃⁻, —SO₂N⁻SO₂F, —RCOO⁻, —RSO₃⁻ and —RSO₂N⁻SO₂R$_f$, R representing C1 to C10 hydrocarbylene group, or R representing C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus, R$^f$ being one selected from the group consisting of fluorine, chlorine, cyanide, C1 to C10 hydrocarbyl group, or R$^f$ representing C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus;

Y being one selected from the group consisting of nitrogen, sulfur and phosphorus;

$R^1$, $R^2$ each being independently one selected from the group consisting of C1 to C10 hydrocarbylene group, or $R^1$, $R^2$ each being independently one selected from the group consisting of C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus;

$R^3$ being one selected from the group consisting of C1 to C10 hydrocarbyl group, or $R^3$ being one selected from the group consisting of C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus;

$50 \leq l \leq 2500$;

$50 \leq n \leq 2500$;

$0 \leq m \leq 3000$;

p being 2 or 3, and the value of p being related with the valence state of Y.

The present disclosure has following beneficial effects.

In the lithium secondary battery of the present disclosure, the polymer protecting layer comprising the polymer ionic liquid is coated on the surface of the lithium metal sheet, which can effectively slow down or even inhibit the growth of the lithium dendrite, improve the first charge-discharge cycle coulombic efficiency of the lithium secondary battery, and significantly improve the cycle performance and the safety performance of the lithium secondary battery.

DETAILED DESCRIPTION

Hereinafter a polymer protecting layer, a lithium metal negative electrode, a lithium secondary battery according to the present disclosure will be described in detail.

Firstly, a polymer protecting layer according to an embodiment of the present disclosure will be described.

The polymer protecting layer according to an embodiment of the present disclosure comprises a polymer ionic liquid with a formula I.

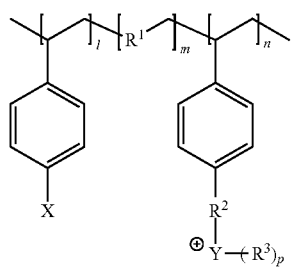

formula I

In formula I, X represents an anion, specifically, X is one selected from the group consisting of $-COO^-$, $-SO_3^-$, $-SO_2N^-SO_2F$, $-RCOO^-$, $-RSO_3^-$ and $-RSO_2N^-SO_2R_f$. R represents C1 to C10 hydrocarbylene group, or R represents C1 to C10 hydrocarbylene group with one or more hydrogen atoms being substituted by one or more elements selected from the group consisting of fluorine (F), chlorine (Cl), bromine (Br), iodine (I), nitrogen (N), oxygen (O), sulfur (S), silicon (Si), boron (B) and phosphorus (P). $R^f$ is one selected from the group consisting of fluorine, chlorine, cyanide (CN), C1 to C10 hydrocarbyl group, or $R^f$ represents C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus.

Y is one selected from the group consisting of nitrogen, sulfur and phosphorus.

$R^1$, $R^2$ each are independently one selected from the group consisting of C1 to C10 hydrocarbylene group, or $R^1$, $R^2$ each are independently one selected from the group consisting of C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus.

$R^3$ is one selected from the group consisting of C1 to C10 hydrocarbyl group, or $R^3$ is one selected from the group consisting of C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus.

$50 \leq l \leq 2500$; $50 \leq n \leq 2500$; $0 \leq m \leq 3000$.

p is 2 or 3, and the value of p is related with the valence state of Y. It should be noted that, when Y is N or P, p is 3. When Y is S, p is 2. The number of the substituent groups $R^3$ which are bonded with Y is p, the substituent groups $R^3$ which are bonded with Y may be same or different. For example, when Y is N and p is 3, the three substituent groups $R^3$ which are bonded with N may be same or different.

Here, "C1 to C10 hydrocarbyl group" means a residual group formed by removing any one hydrogen atom from C1 to C10 hydrocarbon group. The hydrocarbon group may be saturated or unsaturated, such as acyclic alkane, cycloalkane, alkene, alkyne, aromatic hydrocarbon, but the present disclosure is not limited. The hydrocarbon group may have a straight-chain structure, or a branched structure. "C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus" means a residual group formed by removing any one hydrogen atom from C1 to C10 hydrocarbon group with one or more hydrogen atoms being substituted by one or more elements selected from the group consisting of fluorine, chlorine, bromine, iodine, nitrogen, oxygen, sulfur, silicon, boron and phosphorus.

"C1 to C10 hydrocarbylene group" means a residual group formed by removing any two hydrogen atoms from C1 to C10 hydrocarbon group. The hydrocarbon group may be saturated or unsaturated, such as acyclic alkane, cycloalkane, alkene, alkyne, aromatic hydrocarbon, but the present disclosure is not limited. The hydrocarbon group may have a straight-chain structure, or a branched structure. "C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus" means a residual group formed by removing any two hydrogen atoms from C1 to C10 hydrocarbon group with one or more hydrogen atoms being substituted by one or more elements selected from the group consisting of fluorine, chlorine, bromine, iodine, nitrogen, oxygen, sulfur, silicon, boron and phosphorus.

In an embodiment of the present disclosure, the polymer comprising the polymer ionic liquid is coated on the surface of the lithium metal sheet so as to form a polymer protecting layer, which therefore can effectively inhibit severe reactions between the lithium metal sheet and the nonaqueous electrolyte, meanwhile the polymer ionic liquid itself has charged centers (such as an anion center, a cation center and the like) and structure groups (such as an electron-rich aromatic ring and the like), an electric-field distribution on the surface of the lithium metal negative electrode can be homogenized during the charge-discharge cycles of the lithium secondary battery, thereby avoiding the current density being too large, slowing down or even inhibiting the growth of the lithium dendrite, improving the first charge-discharge cycle coulombic efficiency (that is the first coulombic efficiency) of the lithium secondary battery, and significantly improving the cycle performance and the safety performance of the lithium secondary battery.

In an embodiment of the present disclosure, the number-average molecular weight of the polymer ionic liquid with the formula I ranges from 40,000 to 1,000,000.

In an embodiment of the present disclosure, $l:m:n=1:(0.5\sim1.5):(0.5\sim1.5)$.

In an embodiment of the present disclosure, R is one selected from the group consisting of C1 to C8 hydrocarbylene group, C1 to C8 fluorohydrocarbylene group and C1 to C8 hydrocarbylene group with two or more hydrogen atoms being substituted by fluorine atoms and oxygen atoms at the same time. Preferably, R is one selected from the group consisting of C1 to C8 alkylene group, C1 to C8 fluoroalkylene group and C1 to C8 fluoroalkoxy.

In an embodiment of the present disclosure, $R^f$ is one selected from the group consisting of fluorine, C1 to C8 fluorohydrocarbyl group and C1 to C8 hydrocarbyl group with two or more hydrogen atoms being substituted by fluorine atoms and oxygen atoms at the same time. Preferably, $R^f$ is one selected from the group consisting of fluorine, C1 to C8 fluoroalkyl group and C1 to C8 fluoroalkoxy.

In an embodiment of the present disclosure, Y is one selected from the group consisting of nitrogen and phosphorus.

In an embodiment of the present disclosure, preferably, $R^1$ has a branched structure.

In an embodiment of the present disclosure, $R^1$ is one selected from the group consisting of C1 to C4 hydrocarbylene group, or $R^1$ is one selected from the group consisting of C1 to C4 hydrocarbylene group with one or more hydrogen atoms being substituted by one or more elements selected from the group consisting of fluorine, chlorine, bromine, iodine, nitrogen, oxygen, sulfur, silicon, boron and phosphorus. Preferably, $R^1$ is one selected from the group consisting of C1 to C4 alkylene group, or $R^1$ is one selected from the group consisting of C1 to C4 alkylene group with one or more hydrogen atoms being substituted by one or more elements selected from the group consisting of fluorine, chlorine, bromine, iodine, nitrogen, oxygen, sulfur, silicon, boron and phosphorus.

In an embodiment of the present disclosure, $R^2$ is selected from C1 to C8 hydrocarbylene group or C1 to C8 hydrocarbylene group with one or more hydrogen atoms being substituted by one or more oxygen atoms. Preferably, $R^2$ is selected from C1 to C8 alkylene group or C1 to C8 alkoxy. Further preferably, $R^2$ is selected from $-(CH_2)_q-O-(CH_2)_r-$, q and r are independently selected from 1, 2, 3 or 4.

In an embodiment of the present disclosure, $R^3$ is one selected from the group consisting of C1 to C8 hydrocarbyl group, C1 to C8 fluoroalkyl group and C1 to C8 fluoroalkoxy. Preferably, $R^3$ is one selected from the group consisting of $-CH_3$, $-C_2H_5$, $-C_3H_7$, $-C_4H_9$ and $-(CH_2CH_2O)_sCH_3$, s is an integer of 1~8. Preferably, $-C_3H_7$ and $-C_4H_9$ both have a straight-chain structure.

In an embodiment of the present disclosure, a mass percentage of the polymer ionic liquid with the formula I in the polymer protecting layer ranges from 5% to 100%.

In an embodiment of the present disclosure, the polymer protecting layer further comprises a macromolecular compound. The macromolecular compound is one or more selected from the group consisting of polymethylmethacrylate (PMMA), polyethylene oxide (PEO), polyvinylidene fluoride (PVDF), copolymer of vinylidene fluoride and hexafluoropropylene (PVDF-HFP), and polyacrylonitrile (PAN).

In an embodiment of the present disclosure, a mass percentage of the macromolecular compound in the polymer protecting layer is more than 0 and less than or equal to 20%.

In an embodiment of the present disclosure, the polymer protecting layer further comprises inorganic nanoparticles. The material of the inorganic nanoparticles is one or more selected from the group consisting of silicon dioxide ($SiO_2$), titanium dioxide ($TiO_2$), aluminum oxide ($Al_2O_3$), magnesium oxide (MgO), zirconium dioxide ($ZrO_2$), zinc oxide (ZnO), ferroferric oxide ($Fe_3O_4$), barium titanate ($BaTiO_3$), lead titanate ($PbTiO_3$), lithium nitride ($Li_3N$), aluminum lithium oxide ($LiAlO_2$), sodium montmorillonite clay and molecular sieves.

In an embodiment of the present disclosure, a mass percentage of the inorganic nanoparticles in the polymer protecting layer is more than 0 and less than or equal to 50%.

Secondly, a lithium metal negative electrode according to an embodiment of the present disclosure will be described.

The lithium metal negative electrode of the present disclosure comprises: a lithium metal sheet and a polymer protecting layer described above, the polymer protecting layer is provided at the lithium metal sheet. Preferably, the lithium metal sheet is a lithium metal foil.

Thirdly, a lithium secondary battery according to an embodiment of the present disclosure will be described.

The lithium secondary battery according to an embodiment of the present disclosure comprises a lithium metal negative electrode as described above.

The lithium secondary battery according to an embodiment of the present disclosure comprises a positive electrode, a lithium metal negative electrode, a separator and an electrolyte.

In the lithium secondary battery according to an embodiment of the present disclosure, the positive electrode comprises a positive current collector and a positive electrode membrane provided at the positive current collector, the positive electrode membrane comprises a positive active material, a binder and a conductive agent. The specific type of the positive active material is not limited and may be changed as desired. Preferably, the positive active material is one or more selected from the group consisting of lithium cobalt oxide ($LiCoO_2$), lithium nickel oxide ($LiNiO_2$), lithium iron phosphate ($LiFePO_4$), lithium cobalt phosphate ($LiCoPO_4$), lithium manganese phosphate ($LiMnPO_4$), lithium nickel phosphate ($LiNiPO_4$), lithium manganese dioxide ($LiMnO_2$), $LiNi_xA_{(1-x)}O_2$ (A is selected from Co or Mn, $0<x<1$), $LiNi_mB_nC_{(1-m-n)}O_2$ (B and C each are independently one or more selected from the group consisting of Co, Al and Mn, B and C are different, $0<m<1$, $0<n<1$).

In the lithium secondary battery according to an embodiment of the present disclosure, the separator may be any separator used in existing lithium secondary batteries, specifically, the separator may be polyethylene, polypropylene, polyvinylidene fluoride and the combined membrane thereof.

In the lithium secondary battery according to an embodiment of the present disclosure, the electrolyte comprises an organic solvent, a lithium salt and an additive agent.

In the lithium secondary battery according to an embodiment of the present disclosure, the specific type of the organic solvent is not limited and may be changed as desired. Specifically, the organic solvent may be one or more selected from the group consisting of ethylene carbonate, propylene carbonate, dimethyl carbonate, diethyl carbonate, dipropyl carbonate, ethyl methyl carbonate, methyl formate, ethyl formate, ethyl propionate, propyl propionate, methyl butyrate, ethyl acetate, anhydrides, 1-methyl-2-pyrrolidinone, N-methylformamide, N-methylacetamide, acetonitrile, sulfolane, dimethyl sulfoxide, ethylene sulfite, trimethylene sulfite, dimethyl sulfide, diethyl sulfite, dimethyl sulfite, tetrahydrofuran, fluoro-cyclic organic ester, sulfo-cyclic organic ester. A mass percentage of the organic solvent in the electrolyte ranges from 60% to 90%.

In the lithium secondary battery according to an embodiment of the present disclosure, the lithium salt may be one or more selected from the group consisting of organic lithium salts and inorganic lithium salts. Specifically, the lithium salt may be one or more selected from the group consisting of $LiPF_6$, $LiBF_4$, LiTFSI, $LiClO_4$, $LiAsF_6$, LiBOB, LiDFOB, LiTFOP, $LiN(SO_2R_F)_2$ and $LiN(SO_2F)(SO_2R_F)$. The substituent group represents $R_F=C_nF_{2n+1}$, that is $R_F$ represents saturated fluoroalkyl group where whole hydrogen atoms are substituted by fluorine atoms, n is an integer of 1~10, and 2n+1 is more than 0. A content of the lithium salt in the electrolyte ranges from 0.5 mol/L to 1.5 mol/L.

In the lithium secondary battery according to an embodiment of the present disclosure, the additive agent may be any additive agent improving the performance of the battery known in the art, such as an additive agent for forming the SEI membrane, a fire-retardant additive agent, an anti-overcharge additive agent and a conductive additive agent. A mass percentage of the additive agent in the electrolyte ranges from 0.1% to 8%.

Hereafter in order to make the objects, the technology solutions and the beneficial technical effects more clearly, the present disclosure will be described in detail in combination with examples. It should be noted that, the examples described in the present disclosure are only used for explaining the present disclosure, and are not intended to limit the present disclosure.

EXAMPLE 1

Preparation of the positive electrode P1#: lithium cobalt oxide ($LiCoO_2$, positive active material), conductive carbon black (Super-P, conductive agent) and polyvinylidene fluoride (PVDF, binder) were uniformly dispersed in 1-methyl-2-pyrrolidinone (NMP, solvent) to form a positive electrode slurry. A solid content of the positive electrode slurry was 77 wt %, solid components in the positive electrode slurry were 98.26 wt % of lithium cobalt oxide, 0.9 wt % of PVDF and 0.84 wt % of conductive carbon black. Then the positive electrode slurry was uniformly coated on two surfaces of an aluminum foil (positive current collector) with a thickness of 12 μm, a coating weight on each surface of the aluminum foil was 0.0215 g/cm²; then a drying process was performed at 85° C., which was followed by cutting into a disk with a diameter (Φ) of 14 mm, and then the disk was dried under vacuum at 85° C. for 4 h, the obtained positive electrode was marked as P1#.

Preparation of the polymer ionic liquid L1# (formula II): lithium (p-styrenesulfonyl)(fluorosulfonyl)imide (monomer) and (p-methylstyrene)(methoxyethyl)ammonium iodide (monomer) according to a mole ratio of 1:1 were mixed with acetone, then 4 wt % of p-divinylbenzene and 2 wt % of 2-ethoxy-1,2-diphenyl-ethanon were added by means of ultrasonic dispersion, which was followed by UV-initiated cross-linking polymerization, the number-average molecular weight of the polymer ionic liquid was about 80,000, and marked as L1#. In formula II, l was about 140, n was about 140.

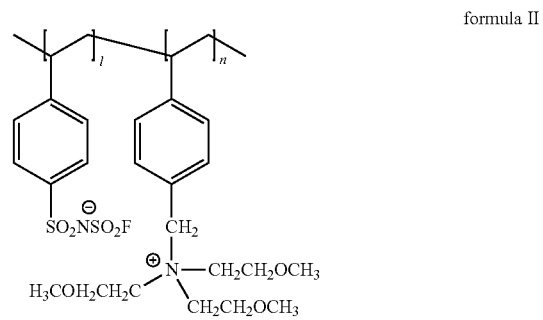

formula II

Preparation of the lithium metal negative electrode N1#: 0.8 g of $Al_2O_3$ was added into 8 g of 1-methyl-2-pyrrolidinone (NMP, solvent) by means of ultrasonic dispersion for 30 min, then 1 g of polymer ionic liquid L1# (formula II) was added and stirred constantly for 5 h, the obtained mixture was uniformly coated on two surfaces of a lithium metal foil, a lithium metal negative electrode was obtained. The obtained lithium metal negative electrode was marked as N1#.

Preparation of the electrolyte E1#: lithium hexafluorophosphate ($LiPF_6$) was slowly added into a mixed solvent of ethylene carbonate (EC) and dimethyl carbonate (DMC) (a volume ratio of EC and DMC was 1:1) to obtain the electrolyte, a concentration of $LiPF_6$ in the electrolyte was 1 mol/L, and the electrolyte was marked as E1#.

Preparation of the lithium secondary battery C1#: a polypropylene membrane (Φ20 mm) with a thickness of 12 μm was used as the separator. The positive electrode P1#, the separator, and the lithium metal negative electrode N1# were laminated in order to make the separator separate the positive electrode from the negative electrode, which was followed by injecting the electrolyte E1# and standing by for 24 h, a CR2430 button cell was obtained, the obtained lithium secondary battery was marked as C1#.

EXAMPLE 2

Preparation of the lithium metal negative electrode N2#: 0.8 g of $Al_2O_3$ was added into 8 g of 1-methyl-2-pyrrolidinone (NMP, solvent) by means of ultrasonic dispersion for 30 min, then 1 g of polymer ionic liquid L1# (formula II) and 0.2 g of polyvinylidene fluoride (PVDF, the number-average molecular weight was about 1,000,000) were added and stirred constantly for 5 h, the obtained mixture was uniformly coated on two surfaces of the lithium metal foil, a lithium metal negative electrode was obtained, the obtained lithium metal negative electrode was marked as N2#.

Preparation of the lithium secondary battery C2#: the preparation of the lithium secondary battery was the same as the preparation of the lithium secondary battery C1#, except that the used lithium metal negative electrode was N2#, and the obtained lithium secondary battery was marked as C2#.

EXAMPLE 3

Preparation of the lithium metal negative electrode N3#: 0.8 g of $Al_2O_3$ was added into 8 g of 1-methyl-2-pyrrolidinone (NMP, solvent) by means of ultrasonic dispersion for 30 min, then 1 g of polymer ionic liquid L1# (formula II) and 0.2 g of polyethylene oxide (PEO, the number-average molecular weight was about 600,000) were added and stirred constantly for 5 h, the obtained mixture was uniformly coated on two surfaces of the lithium metal foil, a lithium metal negative electrode was obtained, the obtained lithium metal negative electrode was marked as N3#.

Preparation of the lithium secondary battery C3#: the preparation of the lithium secondary battery was the same as the preparation of the lithium secondary battery C1#, except that the used lithium metal negative electrode was N3#, and the obtained lithium secondary battery was marked as C3#.

EXAMPLE 4~EXAMPLE 6

Preparation of the polymer ionic liquid L2# (formula III): lithium(p-styrenesulfonyl)(fluorosulfonyl)imide (monomer), (p-methylstyrene) (methoxyethyl)ammonium iodide (monomer) and acrylonitrile (monomer) according to a mole ratio of 1:1:1.2 were mixed with acetone, then 4 wt % of p-divinylbenzene and 2 wt % of 2-ethoxy-1,2-diphenylethanon were added by means of ultrasonic dispersion, which was followed by UV-initiated cross-linking polymerization, the number-average molecular weight of the polymer ionic liquid was about 70,000, and marked as L2#. In formula III, l was about 110, n was about 110, m was about 130.

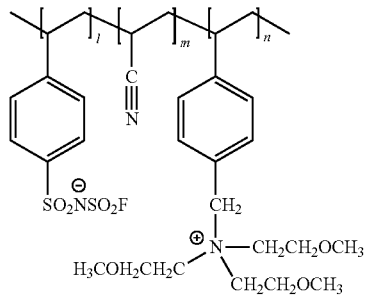

formula III

Preparation of the lithium metal negative electrodes N4#~6#: the preparation of the lithium metal negative electrodes in example 4 to example 6 were respectively the same as the preparation of the lithium metal negative electrodes N1#, N2#, N3#, except that the polymer ionic liquid L2# (formula III) was used instead of the polymer ionic liquid L1# (formula II) in each of example 4 to example 6, and the obtained lithium metal negative electrodes in each of example 4 to example 6 were respectively marked as N4#, N5#, N6#.

Preparation of the lithium secondary batteries C4#~6#: the preparation of the lithium secondary batteries in example 4 to example 6 were respectively the same as the preparation of the lithium secondary batteries C1#, C2#, C3#, except that the used lithium metal negative electrodes in each of example 4 to example 6 were N4#, N5#, N6#, and the obtained lithium secondary batteries in each of example 4 to example 6 were respectively marked as C4#, C5#, C6#.

EXAMPLE 7~EXAMPLE 9

Preparation of the polymer ionic liquid L3# (formula IV): lithium(p-styrenesulfonyl)(fluorosulfonyl)imide (monomer), (p-methyl styrene) (methoxyethyl)ammonium iodide (monomer) and styrene (monomer) according to a mole ratio of 1:1:1.1 were mixed with acetone, then 4 wt % of p-divinylbenzene and 2 wt % of 2-ethoxy-1,2-diphenylethanon were added by means of ultrasonic dispersion, which was followed by UV-initiated cross-linking polymerization, the number-average molecular weight of the polymer ionic liquid was about 65,000, and marked as L3#. In formula IV, l was about 100, n was about 100, m was about 110.

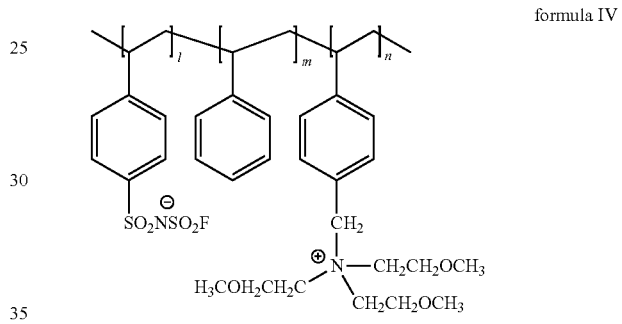

formula IV

Preparation of the lithium metal negative electrodes N7#~9#: the preparation of the lithium metal negative electrodes in example 7 to example 9 were respectively the same as the preparation of the lithium metal negative electrodes N1#, N2#, N3#, except that the polymer ionic liquid L3$^{190}$ (formula IV) was used instead of the polymer ionic liquid L1# (formula II) in each of example 7 to example 9, and the obtained lithium metal negative electrodes in each of example 7 to example 9 were respectively marked as N7#, N8#, N9#.

Preparation of the lithium secondary batteries C7#~9#: the preparation of the lithium secondary batteries in example 7 to example 9 were respectively the same as the preparation of the lithium secondary batteries C1#, C2#, C3#, except that the used lithium metal negative electrodes in each of example 7 to example 9 were N7#, N8#, N9#, and the obtained lithium secondary batteries in each of example 7 to example 9 were respectively marked as C7#, C8#, C9#.

EXAMPLE 10

Preparation of the polymer ionic liquid L4# (formula V): lithium p-styrenesulfonate (monomer), (p-methylstyrene) (methoxyethyl)ammonium iodide (monomer) and acrylonitrile (monomer) according to a mole ratio of 1:1:1.5 were mixed with acetone, then 4 wt % of p-divinylbenzene and 2 wt % of 2-ethoxy-1,2-diphenyl-ethanon were added by means of ultrasonic dispersion, which was followed by UV-initiated cross-linking polymerization, the number-average molecular weight of the polymer ionic liquid was about 70,000, and marked as L4#. In formula V, l was about 120, n was about 120, m was about 180.

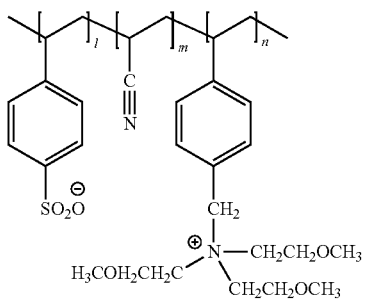

formula V

Preparation of the lithium metal negative electrode N10#: the preparation of the lithium metal negative electrode was the same as the preparation of the lithium metal negative electrode N1#, except that the polymer ionic liquid L4# (formula V) was used instead of the polymer ionic liquid L1# (formula II), and the obtained lithium metal negative electrode was marked as N10#.

Preparation of the lithium secondary battery C10#: the preparation of the lithium secondary battery was the same as the preparation of the lithium secondary battery C1#, except that the used lithium metal negative electrode was N10#, and the obtained lithium secondary battery was marked as C10#.

EXAMPLE 11

Preparation of the polymer ionic liquid L5# (formula VI): lithium p-styrenesulfonate (monomer), (p-methylstyrene)(methoxyethyl)phosphonium iodide (monomer) and acrylonitrile (monomer) according to a mole ratio of 1:1:1.5 were mixed with acetone, then 4 wt % of p-divinylbenzene and 2 wt % of 2-ethoxy-1,2-diphenyl-ethanon were added by means of ultrasonic dispersion, which was followed by UV-initiated cross-linking polymerization, the number-average molecular weight of the polymer ionic liquid was about 68,000, and marked as L5#. In formula VI, l was about 110, n was about 110, m was about 165.

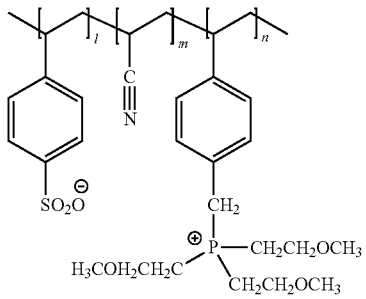

formula VI

Preparation of the lithium metal negative electrode N11#: the preparation of the lithium metal negative electrode was the same as the preparation of the lithium metal negative electrode N1#, except that the polymer ionic liquid L5# (formula VI) was used instead of the polymer ionic liquid L1# (formula II), and the obtained lithium metal negative electrode was marked as N11#.

Preparation of the lithium secondary battery C11#: the preparation of the lithium secondary battery was the same as the preparation of the lithium secondary battery C1#, except that the used lithium metal negative electrode was N11#, and the obtained lithium secondary battery was marked as C11#.

EXAMPLE 12

Preparation of the polymer ionic liquid L6# (formula VII): lithium 4-ethenyl-benzoate (monomer), (p-methylstyrene)(methoxyethyl)ammonium iodide (monomer) and acrylonitrile (monomer) according to a mole ratio of 1:1:1.5 were mixed with acetone, then 4 wt % of p-divinylbenzene and 2 wt % of 2-ethoxy-1,2-diphenyl-ethanon were added by means of ultrasonic dispersion, which was followed by UV-initiated cross-linking polymerization, the number-average molecular weight of the polymer ionic liquid was about 78,000, and marked as L6#. In formula VII, l was about 140, n was about 140, m was about 210.

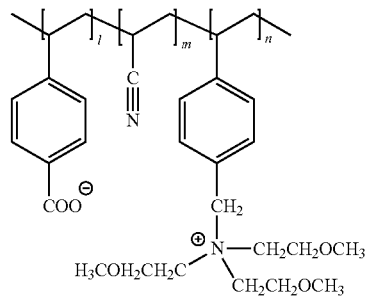

formula VII

Preparation of the lithium metal negative electrode N12#: the preparation of the lithium metal negative electrode was the same as the preparation of the lithium metal negative electrode N1#, except that the polymer ionic liquid L6# (formula VII) was used instead of the polymer ionic liquid L1# (formula II), and the obtained lithium metal negative electrode was marked as N12#.

Preparation of the lithium secondary battery C12#: the preparation of the lithium secondary battery was the same as the preparation of the lithium secondary battery C1#, except that the used lithium metal negative electrode was N12#, and the obtained lithium secondary battery was marked as C12#.

EXAMPLE 13

Preparation of the lithium metal negative electrode N13#: the preparation of the lithium metal negative electrode was the same as the preparation of the lithium metal negative electrode N1#, except that $Al_2O_3$ was not used, and the obtained lithium metal negative electrode was marked as N13#.

Preparation of the lithium secondary battery C13#: the preparation of the lithium secondary battery was the same as the preparation of the lithium secondary battery C1#, except that the used lithium metal negative electrode was N13#, and the obtained lithium secondary battery was marked as C13#.

EXAMPLE 14

Preparation of the lithium metal negative electrode N14#: the preparation of the lithium metal negative electrode was the same as the preparation of the lithium metal negative electrode N4#, except that Al₂O₃ was not used, and the obtained lithium metal negative electrode was marked as N14#.

Preparation of the lithium secondary battery C14#: the preparation of the lithium secondary battery was the same as the preparation of the lithium secondary battery C4#, except that the used lithium metal negative electrode was N14#, and the obtained lithium secondary battery was marked as C14#.

EXAMPLE 15

Preparation of the lithium metal negative electrode N15#: the preparation of the lithium metal negative electrode was the same as the preparation of the lithium metal negative electrode N7#, except that Al₂O₃ was not used, and the obtained lithium metal negative electrode was marked as N15#.

Preparation of the lithium secondary battery C15#: the preparation of the lithium secondary battery was the same as the preparation of the lithium secondary battery C7#, except that the used lithium metal negative electrode was N15#, and the obtained lithium secondary battery was marked as C15#.

EXAMPLE 16

Preparation of the lithium metal negative electrode N16#: the preparation of the lithium metal negative electrode was the same as the preparation of the lithium metal negative electrode N4#, except that the number-average molecular weight of the polymer ionic liquid (formula III) was about 400,000 (l was about 620, n was about 620, m was about 750), and the obtained lithium metal negative electrode was marked as N16#.

Preparation of the lithium secondary battery C16#: the preparation of the lithium secondary battery was the same as the preparation of the lithium secondary battery C4#, except that the used lithium metal negative electrode was N16#, and the obtained lithium secondary battery was marked as C16#.

EXAMPLE 17

Preparation of the lithium metal negative electrode N17#: the preparation of the lithium metal negative electrode was the same as the preparation of the lithium metal negative electrode N4#, except that the number-average molecular weight of the polymer ionic liquid (formula III) was about 1,000,000 (l was about 1500, n was about 1500, m was about 1800), and the obtained lithium metal negative electrode was marked as N17#.

Preparation of the lithium secondary battery C17#: the preparation of the lithium secondary battery was the same as the preparation of the lithium secondary battery C4#, except that the used lithium metal negative electrode was N17#, and the obtained lithium secondary battery was marked as C17#.

COMPARATIVE EXAMPLE 1

Preparation of the lithium metal negative electrode DN1#: Al₂O₃ and the polymer ionic liquid were not used, a lithium metal foil without a coating process was directly used instead of the lithium metal negative electrode N1#, and the obtained lithium metal negative electrode was marked as DN1#.

Preparation of the lithium secondary battery DC1#: the preparation of the lithium secondary battery was the same as the preparation of the lithium secondary battery C1#, except that the used lithium metal negative electrode was DN1#, and the obtained lithium secondary battery was marked as DC1#.

COMPARATIVE EXAMPLE 2

Preparation of the lithium metal negative electrode DN2#: 0.8 g of Al₂O₃ was added into 8 g of 1-methyl-2-pyrrolidinone (NMP, solvent) by means of ultrasonic dispersion for 30 min, then 1.2 g of polyvinylidene fluoride (PVDF, the number-average molecular weight was about 1,000,000) was added and stirred constantly for 5 h, the obtained mixture was uniformly coated on two surfaces of the lithium metal foil, a lithium metal negative electrode was obtained, the obtained lithium metal negative electrode was marked as DN2#.

Preparation of the lithium secondary battery DC2#: the preparation of the lithium secondary battery was the same as the preparation of the lithium secondary battery C1#, except that the used lithium metal negative electrode was DN2#, and the obtained lithium secondary battery was marked as DC2#.

COMPARATIVE EXAMPLE 3

Preparation of the lithium metal negative electrode DN3#: 0.8 g of Al₂O₃ was added into 8 g of 1-methyl-2-pyrrolidinone (NMP, solvent) by means of ultrasonic dispersion for 30 min, then 1.2 g of polyethylene oxide (PEO, the number-average molecular weight was about 600,000) was added and stirred constantly for 5 h, the obtained mixture was uniformly coated on two surfaces of the lithium metal foil, a lithium metal negative electrode was obtained, the obtained lithium metal negative electrode was marked as DN3#.

Preparation of the lithium secondary battery DC3#: the preparation of the lithium secondary battery was the same as the preparation of the lithium secondary battery C1#, except that the used lithium metal negative electrode was DN3#, and the obtained lithium secondary battery was marked as DC3#.

Next testing processes of the lithium secondary batteries would be described.

(1) Testing of the first coulombic efficiency: the lithium secondary battery was charged to 4.25 V at a constant current of 0.65 mA/cm², then the lithium secondary battery was charged to 0.16 mA/cm² at a constant voltage of 4.25 V to obtain a first cycle specific charge capacity ($C_{c1}$); then the lithium secondary battery was discharged to 3.0 V at a constant current of 0.65 mA/cm² to obtain a first cycle specific discharge capacity ($C_{d1}$). First coulombic efficiency of the lithium secondary battery=$(C_{d1})/(C_{c1})$.

(2) Testing of the capacity retention rate: the lithium secondary battery was charged to 4.25 V at a constant current of 0.65 mA/cm², then the lithium secondary battery was charged to 0.16 mA/cm² at a constant voltage of 4.25 V, then the lithium secondary battery was discharged to 3.0 V at a constant current of 0.65 mA/cm² to obtain a first cycle specific discharge capacity ($C_{d1}$); the above process was a charge-discharge cycle, then the charge-discharge cycle was repeated for n cycles, the specific discharge capacity of the lithium secondary battery after n cycles was marked as $C_{dn}$. The capacity retention rate=$(C_{dn})/(C_{d1})$.

(3) Observing the surface of the lithium metal negative electrode: the lithium secondary battery after n cycles was disassembled, and the surface of the lithium metal negative electrode was observed with an optical microscope, so as to confirm whether the lithium dendrite was formed.

TABLE 1

Parameters and test results of lithium secondary batteries of examples 1-17 and comparative examples 1-3

| | lithium metal negative electrode | lithium secondary battery | polymer ionic liquid | macro-molecular compound | inorganic nano-particles | first coulombic efficiency (%) | capacity retention rate after 100 cycles (%) | lithium dendrite |
|---|---|---|---|---|---|---|---|---|
| Example 1 | N1# | C1# | II | / | $Al_2O_3$ | 97.4 | 88.0 | no |
| Example 2 | N2# | C2# | II | PVDF | $Al_2O_3$ | 98.1 | 90.3 | no |
| Example 3 | N3# | C3# | II | PEO | $Al_2O_3$ | 97.6 | 85.1 | no |
| Example 4 | N4# | C4# | III | / | $Al_2O_3$ | 98.3 | 91.4 | no |
| Example 5 | N5# | C5# | III | PVDF | $Al_2O_3$ | 98.5 | 94.5 | no |
| Example 6 | N6# | C6# | III | PEO | $Al_2O_3$ | 98.0 | 87.5 | no |
| Example 7 | N7# | C7# | IV | / | $Al_2O_3$ | 98.8 | 96.6 | no |
| Example 8 | N8# | C8# | IV | PVDF | $Al_2O_3$ | 98.7 | 98.9 | no |
| Example 9 | N9# | C9# | IV | PEO | $Al_2O_3$ | 98.1 | 89.0 | no |
| Example 10 | N10# | C10# | V | / | $Al_2O_3$ | 98.0 | 91.0 | no |
| Example 11 | N11# | C11# | VI | / | $Al_2O_3$ | 97.6 | 90.4 | no |
| Example 12 | N12# | C12# | VII | / | $Al_2O_3$ | 95.6 | 87.4 | no |
| Example 13 | N13# | C13# | II | / | / | 96.9 | 66.9 | slight |
| Example 14 | N14# | C14# | III | / | / | 98.0 | 64.3 | slight |
| Example 15 | N15# | C15# | IV | / | / | 96.5 | 63.2 | slight |
| Example 16 | N16# | C16# | III | / | $Al_2O_3$ | 97.5 | 83.0 | no |
| Example 17 | N17# | C17# | III | / | $Al_2O_3$ | 96.1 | 75.4 | no |
| Comparative example 1 | DN1# | DC1# | / | / | / | 95.3 | short-circuited | serious |
| Comparative example 2 | DN2# | DC2# | / | PVDF | $Al_2O_3$ | 92.9 | 14.4 | serious |
| Comparative example 3 | DN3# | DC3# | / | PEO | $Al_2O_3$ | 85.9 | 1.7 | serious |

It could be seen from Table 1: in the present disclosure, after the polymer ionic liquid was coated on the surface of the lithium metal sheet (that is the lithium metal foil in examples 1-17), the first coulombic efficiency and the capacity retention rate after 100 cycles of the lithium secondary batteries C1#~17# were obviously higher than the lithium secondary battery DC1# which was not coated with the polymer ionic liquid. After the lithium secondary battery was disassembled and the surface of the lithium metal negative electrode was observed with the optical microscope, it could be seen that a thin and dense interface membrane was formed on the surface of the lithium metal negative electrode after the polymer ionic liquid was coated, and the surface of the lithium metal negative electrode (DC1#) without being coated with the polymer ionic liquid was coated with a thick and incompact brown deposit, and the deposit has a great deal of lithium dendrite, the existing of the lithium dendrite on the surface of the lithium metal negative electrode DC1# was the main reason causing the lithium secondary battery short-circuited. This was because after the polymer ionic liquid was coated on the surface of the lithium metal sheet, the styrene structure in the polymer ionic liquid made the polymer protecting layer on the surface of the lithium metal sheet have a higher mechanical strength, which was beneficial to inhibit the growth of the lithium dendrite; the charged centers (such as the sulfonyl imide anion center containing fluorine, the quarternary ammonium cation center and the like) and the structure groups (such as the electron-rich aromatic ring and the like) in the polymer ionic liquid might form a network structure via electrostatic interaction, thereby effectively controlling and homogenizing the electric-field distribution on the surface of the lithium metal negative electrode during the charge-discharge cycles, avoiding the current density being too large which is caused by an uneven surface of the lithium metal negative electrode, slowing down or even inhibiting the growth of the lithium dendrite, improving the safety performance of the lithium secondary battery; the polymer ionic liquid had a sulfonyl imide anion containing fluorine, therefore an excellent SEI membrane could be formed on the surface of the lithium metal negative electrode, thereby further inhibiting the overreaction between the lithium metal negative electrode and the electrolyte, and decreasing capacity loss of the lithium secondary battery.

After the inorganic nanoparticles were added, the first coulombic efficiency and the capacity retention rate after 100 cycles of the lithium secondary batteries C1#, C4#, C7#, C10#, C11#, C12# were promoted compared with the lithium secondary batteries C13#~15#. This was because after the inorganic nanoparticles were added, the transmission speed of the lithium ions in the polymer protecting layer was increased, and the compactness of the interface between the polymer protecting layer and the lithium metal sheet was increased to a certain degree, thereby improving the interfacial compatibility between the polymer protecting layer and the lithium metal sheet.

After the polymer ionic liquid was coated on the lithium metal sheet, the lithium secondary batteries C13#~15# had a higher first coulombic efficiency and a higher capacity retention rate compared with the lithium secondary batteries DC2# and DC3# where only PVDF or PEO was coated on the lithium metal sheet. This was because compared with PVDF or PEO, the polymer ionic liquid had a plurality of functional groups: the sulfonyl imide anion containing fluorine had a higher charge delocalization, which increases the transmission rate of the lithium ions; the quarternary ammonium cation had a plurality of polar ether groups (13 O—), thereby enhancing the dissolving capacity of the lithium salt, increasing the number of current carriers, increasing the room-temperature conductivity and the transmission rate of the lithium ions; the charged centers (such as an anion center and a cation center) and the structure groups (such as the electron-rich aromatic ring and the like) could effectively homogenize the electric-field distribution on the surface of the lithium metal negative electrode during the charge-discharge cycles, thereby slowing down or even inhibiting the growth of the lithium dendrite.

However, compared with the lithium secondary batteries C13#~15#, further adding a small amount of PVDF or PEO into the polymer ionic liquid (corresponding to the lithium secondary batteries C2#~3#, C5#~6#, C8#~9#) might further improve the cycle performance of the lithium secondary batteries, this was because the mixture of the polymer ionic liquid and the macromolecular compound could further improve the conductive property of the lithium ions on the surface of the lithium metal negative electrode.

In addition, the number-average molecular weight of the polymer ionic liquid might also affect the performance of the lithium secondary batteries. Compared with the lithium secondary battery C4#, the lithium secondary batteries C16# and C17# had a relatively high number-average molecular weight, which affects the transmitting kinetics of the lithium ions of the lithium secondary batteries during the charge-discharge cycles, and thereby slightly decreasing the first coulombic efficiency and the capacity retention rate after 100 cycles of the lithium secondary batteries.

According to the foregoing descriptions and teachings of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed is:

1. A lithium secondary battery, comprising a lithium metal negative electrode, the lithium metal negative electrode comprising:
   a lithium metal sheet; and
   a polymer protecting layer provided at the lithium metal sheet;
   the polymer protecting layer comprising inorganic nanoparticles and a polymer ionic liquid with a formula I;

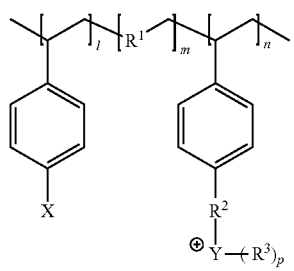

formula I in formula I,
X being one selected from the group consisting of —COO$^-$, —SO$_3^-$, —SO$_2$N$^-$SO$_2$F, —RCOO$^-$, —RSO$_3^-$ and —RSO$_2$N$^-$SO$_2$R$_f$, R representing C1 to C10 hydrocarbylene group, or R representing C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus, R$^f$ being one selected from the group consisting of fluorine, chlorine, cyanide, C1 to C10 hydrocarbyl group, or R$^f$ representing C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus;

Y being one selected from the group consisting of nitrogen, sulfur and phosphorus;

R$^1$, R$^2$ each being independently one selected from the group consisting of C1 to C10 hydrocarbylene group, or R$^1$, R$^2$ each being independently one selected from the group consisting of C1 to C10 hydrocarbylene group with one or more hydrogen atoms being substituted by one or more elements selected from the group consisting of fluorine, chlorine, bromine, iodine, nitrogen, oxygen, sulfur, silicon, boron and phosphorus;

R$^3$ being one selected from the group consisting of C1 to C10 hydrocarbyl group, or R$^3$ being one selected from the group consisting of C1 to C10 hydrocarbyl group with one or more hydrogen atoms being substituted by one or more elements selected from the group consisting of fluorine, chlorine, bromine, iodine, nitrogen, oxygen, sulfur, silicon, boron and phosphorus;

$50 \leq l \leq 2500$;

$50 \leq n \leq 2500$;

$0 \leq m \leq 3000$;

p being 2 or 3, and the value of p being related with the valence state of Y.

2. The lithium secondary battery according to claim 1, wherein the number-average molecular weight of the polymer ionic liquid with the formula I ranges from 40,000 to 1,000,000.

3. The lithium secondary battery according to claim 1, wherein l:m:n=1:(0.5~1.5):(0.5~1.5).

4. The lithium secondary battery according to claim 1, wherein
R is one selected from the group consisting of C1 to C8 hydrocarbylene group, C1 to C8 fluorohydrocarbylene group and C1 to C8 hydrocarbylene group with two or more hydrogen atoms being substituted by fluorine atoms and oxygen atoms at the same time;
R$^f$ is one selected from the group consisting of fluorine, C1 to C8 fluorohydrocarbyl group and C1 to C8 hydrocarbyl group with two or more hydrogen atoms being substituted by fluorine atoms and oxygen atoms at the same time;
Y is one selected from the group consisting of nitrogen and phosphorus;
R$^1$ is one selected from the group consisting of C1 to C4 hydrocarbylene group, or R$^1$ is one selected from the group consisting of C1 to C4 hydrocarbylene group with one or more hydrogen atoms being substituted by one or more elements selected from the group consisting of fluorine, chlorine, bromine, iodine, nitrogen, oxygen, sulfur, silicon, boron and phosphorus;
R$^2$ is selected from C1 to C8 hydrocarbylene group or C1 to C8 hydrocarbylene group with one or more hydrogen atoms being substituted by one or more oxygen atoms;
R$^3$ is one selected from the group consisting of C1 to C8 hydrocarbyl group, C1 to C8 fluoroalkyl group and C1 to C8 fluoroalkoxy.

5. The lithium secondary battery according to claim 4, wherein
R is one selected from the group consisting of C1 to C8 alkylene group, C1 to C8 fluoroalkylene group and C1 to C8 fluoroalkoxy;
$R^f$ is one selected from the group consisting of fluorine, C1 to C8 fluoroalkyl group and C1 to C8 fluoroalkoxy;
$R^1$ is one selected from the group consisting of C1 to C4 alkylene group, or $R^1$ is one selected from the group consisting of C1 to C4 alkylene group with one or more hydrogen atoms being substituted by one or more elements selected from the group consisting of fluorine, chlorine, bromine, iodine, nitrogen, oxygen, sulfur, silicon, boron and phosphorus;
$R^2$ is selected from C1 to C8 alkylene group or C1 to C8 alkoxy;
$R^3$ is one selected from the group consisting of —$CH_3$, —$C_2H_5$, —$C_3H_7$, —$C_4H_9$ and —$(CH_2CH_2O)_sCH_3$, s is an integer of 1~8.

6. The lithium secondary battery according to claim 1, wherein a mass percentage of the polymer ionic liquid with a formula I in the polymer protecting layer ranges from 5% to 100%.

7. The lithium secondary battery according to claim 1, wherein the polymer protecting layer further comprises a macromolecular compound, the macromolecular compound is one or more selected from the group consisting of polymethylmethacrylate, polyethylene oxide, polyvinylidene fluoride, copolymer of vinylidene fluoride and hexafluoropropylene, and polyacrylonitrile.

8. The lithium secondary battery according to claim 7, wherein a mass percentage of the macromolecular compound in the polymer protecting layer is more than 0 and less than or equal to 20%.

9. The lithium secondary battery according to claim 1, wherein the material of the inorganic nanoparticles is one or more selected from the group consisting of silicon dioxide, titanium dioxide, aluminum oxide, magnesium oxide, zirconium dioxide, zinc oxide, ferroferric oxide, barium titanate, lead titanate, lithium nitride, aluminum lithium oxide, sodium montmorillonite clay and molecular sieves.

10. The lithium secondary battery according to claim 9, wherein a mass percentage of the inorganic nanoparticles in the polymer protecting layer is more than 0 and less than or equal to 50%.

* * * * *